US012446591B2

(12) United States Patent
Li (10) Patent No.: US 12,446,591 B2
(45) Date of Patent: Oct. 21, 2025

(54) METHOD OF MAKING CHOCOLATE (71) Applicant: Bowen Li, Beijing (CN)

(72) Inventor: Bowen Li, Beijing (CN)

( * ) Notice: Subject to any disclaimer, the term of this patent is extended or adjusted under 35 U.S.C. 154(b) by 464 days.

(21) Appl. No.: 18/163,713

(22) Filed: Feb. 2, 2023

(65) Prior Publication Data

US 2024/0016174 A1 Jan. 18, 2024

(30) Foreign Application Priority Data

Jul. 18, 2022 (CN) .......................... 202210843347.7

(51) Int. Cl.
*A23G 1/00* (2025.01)
*A24F 40/20* (2020.01)
*A24F 40/42* (2020.01)
*A24F 40/51* (2020.01)
*A24F 40/57* (2020.01)
*A24F 40/70* (2020.01)

(52) U.S. Cl.
CPC ......... *A23G 1/0063* (2013.01); *A23G 1/0073* (2013.01); *A23G 1/0083* (2013.01); *A24F 40/20* (2020.01); *A24F 40/42* (2020.01); *A24F 40/51* (2020.01); *A24F 40/57* (2020.01); *A24F 40/70* (2020.01)

(58) Field of Classification Search
CPC .... A23G 1/0003; A23G 1/005; A23G 1/0053; A23G 1/0056; A23G 1/0059; A23G 1/0063; A23G 1/0073; A23G 1/0079; A23G 1/0083; A23G 1/20; A23G 1/201; A23G 1/202; A23G 1/203; A23G 1/50; A23G 1/505; A24F 40/20; A24F 40/40; A24F 40/42; A24F 40/50; A24F 40/51; A24F 40/57; A24F 40/70
USPC ........ 426/106, 112, 115, 116, 118, 132, 135, 426/512, 514; 392/390
See application file for complete search history.

(56) References Cited

U.S. PATENT DOCUMENTS

| 1,778,479 | A | * | 10/1930 | Baier | ..................... | A23G 9/503 |
| | | | | | | 426/90 |
| 3,307,503 | A | * | 3/1967 | Elmer, Jr. | ............ | A23G 3/0242 |
| | | | | | | 426/516 |
| 2006/0051476 | A1 | * | 3/2006 | Fornaguera | ............ | A23G 3/203 |
| | | | | | | 426/516 |
| 2011/0045114 | A1 | * | 2/2011 | Whetstone, Jr. | ......... | A23G 1/21 |
| | | | | | | 264/219 |

(Continued)

FOREIGN PATENT DOCUMENTS

| CN | 209825081 U | 12/2019 |
| CN | 209983467 U | 1/2020 |

(Continued)

*Primary Examiner* — Viren A Thakur
*Assistant Examiner* — Austin Parker Taylor
(74) *Attorney, Agent, or Firm* — Nitin Kaushik (57) ABSTRACT

A method of making chocolate is provided, comprising the steps of: (a) preparing a mouthpiece that can contain chocolate; (b) receiving the prepared chocolate into the mouthpiece and installing a temperature sensor and/or a heater into the mouthpiece; (c) connecting the mouthpiece of step (b) with a smokable aerosol product main body to complete the making procedure. The chocolate prepared by this method enables a dual consumption regime of both retail consumption and realistic smoking aerosol experience.

12 Claims, 10 Drawing Sheets

(56) References Cited

U.S. PATENT DOCUMENTS

| | | | | |
|---|---|---|---|---|
| 2015/0013702 A1* | 1/2015 | Liu | ............... | A24F 40/46 |
| | | | | 131/329 |
| 2015/0024109 A1* | 1/2015 | Paggios | ............... | A23G 1/32 |
| | | | | 426/631 |
| 2016/0143360 A1* | 5/2016 | Sanchez | ............... | A24F 40/40 |
| | | | | 239/302 |
| 2016/0206006 A1* | 7/2016 | Li | ............... | H05B 1/0244 |
| 2017/0049123 A1* | 2/2017 | Laurijssen | ............... | A23G 1/0093 |
| 2017/0319010 A1* | 11/2017 | Brown | ............... | B26D 3/185 |
| 2019/0255723 A1* | 8/2019 | Chan | ............... | B26D 7/01 |
| 2020/0120984 A1* | 4/2020 | Rogan | ............... | A24F 40/44 |
| 2020/0120988 A1* | 4/2020 | Qiu | ............... | A24F 40/50 |
| 2022/0104532 A1* | 4/2022 | Mua | ............... | A24B 15/40 |
| 2023/0309612 A1* | 10/2023 | Hejazi | ............... | A61M 11/048 |
| | | | | 131/329 |

FOREIGN PATENT DOCUMENTS

| | | | | |
|---|---|---|---|---|
| CN | 214854090 U | 11/2021 | | |
| CN | 214854362 U * | 11/2021 | | |
| EP | 2656741 A2 * | 10/2013 | ............... | A23B 2/88 |

* cited by examiner

METHOD OF MAKING CHOCOLATE

CROSS-REFERENCE TO RELATED APPLICATIONS

The application claims priority to Chinese patent application No. 202210843347.7, filed on Jul. 18, 2022, the entire contents of which are incorporated herein by reference.

TECHNICAL FIELD

The present invention relates to a method of making chocolate, in particular in smokable aerosol products, in the field of food flavoring.

BACKGROUND

Chocolate making methods in the prior art are diverse. The methods mainly included are the production of simple chocolate, and food and drink products related to chocolate, and chocolate products added to the product for added interest. The present invention jumps out of these thought frames to consider chocolate production related to smokable aerosol products.

Smokable aerosol products, such as e-cigarettes, non-burning cigarettes, diverging constituents may be added to the aerosol-generating mechanism, such that a smoker can experience flavours other than traditional tobacco during aerosol smoking of tobacco-related substrate generation using smokable aerosol products. This addition of divergent ingredients, however, merely simulates flavours other than tobacco, and does not allow the smoker to experience a realistic sensation in practice, such as a strawberry flavor additive is simply to simulate the aroma of strawberry, but not experiencing the sensation of eating strawberries. These fragrances (such as the strawberry flavor, the orange flavor, the mint flavor etc.) usually tend to be artificially synthesized molecular agents, not natural ingredients, so that the experiencer can only produces one kind of psychological cue, that the flavors of these substances are experienced by themselves. However, it is in fact known that there is no real feeling of the odor or even chewing to real life while smoking aerosols. Since the prior art does not disclose a real fruit or flesh product, either the food items that the smoker wants to experience, which are provided in electronic cigarettes, non-burning cigarettes, nor is it considered how to make, so that the smoker only stays in the feeling scenarios of self-placebo simulating the experience and real chewing which is perceived to be experienced.

In prior art, when considering flavor simulations, an additive and the tobacco product are mixed or separately stored in a region that can be heated, almost without exception, so that they emanate together with aerosols to be smoked. Thus, there are clear disadvantages as following. Firstly, no consideration is given to jumping out of the heating area to introduce real chocolate content in other components of the smokable aerosol products, and secondly, the current smoking regimes lead to mouth entry before flavor experience in the nasal cavity. Therefore, there is a need for improvement in the thinking of the making method and the experiencing manner.

Therefore, how to consider transformation of flavour additives to real-food, (e.g., chocolate), into the perception of the smell of chocolate and even chewing the realistic food, respectively, at the same time or in more or less sequential moment of smoking aerosol, is a new idea of additional experience of realistic smoking.

SUMMARY

The present invention is directed to solving the above-mentioned problems by considering design about a mouthpiece, putting chocolate onto a mouthpiece, and controlling the temperature of the chocolate to produce a realistic chocolate aroma and a realistic smoking experience of chewing onto the chocolate.

In order to achieve the realistic smoking experience described above, the present invention provides a chocolate making method, characterized by the following steps of:
(a) preparing a mouthpiece that can contain chocolate;
(b) receiving the prepared chocolate into the mouthpiece and installing a temperature sensor and/or a heater into the mouthpiece;
(c) connecting the mouthpiece of step (b) with the main body of a smokable aerosol product to complete the making procedure.

Wherein, the mouthpiece in step (a) comprises a mouthpiece main body, a mouth end removably coupled to the mouthpiece main body, wherein the mouthpiece main body has an inner wall a middle wall and an outer wall, which are arranged in sequence from inner to outer with enclosing structures, the surrounding inner wall forming an aerosol channel, the middle wall and the inner wall forming a chocolate receiving cavity therebetween surrounding the aerosol channel, the outer wall and the middle wall forming a heater receiving cavity therebetween surrounding the chocolate receiving cavity.

Preferably, the chocolate comprises granulated chocolate beans and a hollow solid enveloped chocolate column. Preferably, the chocolate beans have a diameter of 1-5 mm and the chocolate column matches the geometry of chocolate receiving cavity, the geometry comprising a hollow cylinder, a hollow prism, a hollow elliptical column having pre-set thickness wall (i.e. a cross-section perpendicular to height is ellipsoid having pre-set wall thickness width), wherein the chocolate beans are produced by means of an arrayed conveying ducts, with molten fluid chocolate forming a plurality of lines of chocolate on a cooling plate conveyed on a conveyor belt, and the cooling plate carrying the multiple passes of chocolate lines is conveyed through a conveyor belt to a midstream cutting zone, the plurality of chocolate lines are divided into chocolate dots by arrayed blades, and further the cooling plate is conveyed to a downstream cooling zone to make the chocolate dots harden, i.e., forming a plurality of chocolate beans arranged in a dot formation on a cooling plate.

preferably, a cutting-off plate is provided on one side of the array delivery ducts, used at the output port for the flexible chocolate passing through the arrayed conveying ducts, to block the chocolate from continuing to fall onto the conveyor belt between the next cooling plate and the cooling plate currently carrying the multiple passes of chocolate lines that have been formed, after the multiple passes of chocolate lines are formed, therefore contamination is avoided. And when the cutting-off plate completely passes through the output port, the next cooling plate on which a plurality of chocolate lines can be continuously formed are just at the lower end of the output port, thus constantly forming a plurality of cooling plates carrying a plurality of chocolate lines.

Preferably, the cooling plates are made of food grade metal plate. The array blades have a spacing of less than 6 mm between two adjacent blades, each of which has a thickness of 1-3 mm, so that adjacent dots of the chocolate lattice can be divided into spatial distances between them to avoid possible contact merging together again.

The chocolate column with the hollow solid enclosing structure is made by the steps of: making a paper mould with the hollow solid enclosing structure, injecting pulped chocolate into the hollow solid enclosing structure, which is sprayed through a midstream dry ice chamber towards the mould and then out of the dry ice chamber, and collected and packaged downstream, therefore a column of chocolate is formed in the hollow solid enclosing structure. The column of chocolate can be torn apart individually or removed from the mould in use, so the paper mould serves dual roles of chocolate column forming and product overwrapping during production.

Preferably, the surface of paper mould in contact with the chocolate has a smooth oily structure.

Preferably, the mouth end has a closed structure which abuts against the inner wall, to form an air flow barrier between the chocolate receiving cavity and the aerosol channel, with at least one through hole in communication with the chocolate receiving cavity, when the mouth end is coupled to the mouthpiece main body.

It will be appreciated that the condition of the air flow barrier avoids the contact of aerosol on chocolate thereby adhering hazardous materials to chocolate surface, while through holes facilitate expulsion of chocolate flavour, especially the heated chocolate may more easily smell.

The preset thickness is 2-5 mm.

The step (b) in particular comprises: the chocolate receiving cavity comprises a carrier portion, formed in the chocolate receiving cavity and with at least one thermometric aperture secured to the inner and middle walls; and the top of the heater receiving cavity has a sealing ring; placing the prepared chocolate into the chocolate receiving cavity such that the carrier portion supports the chocolate, then connecting the mouth end with the mouthpiece main body; mounting a heater into the heater receiving chamber, and/or mounting at least one temperature sensor into the chocolate receiving chamber on the other side opposite to the side of the carrier portion supporting the chocolate, capping at the bottom of the chocolate receiving chamber by a sealing cap and directing signal wires from fine apertures at the bottom of the sealing cap, and sealing the fine apertures with sealant.

Preferably, the heater is a coil or a microwave radiation device, the temperature sensor is an infrared temperature sensor, the current temperature of the chocolate is calculated by a spectroscopy processor provided in the main body of the smokable aerosol product by receiving the infrared rays emitted by the chocolate in real time to the thermometer. The controller provided in the main body of the smokable aerosol product controls the heater to be turned off when the temperature exceeds a predetermined temperature.

Preferably, the preset temperature is 37-60° C. Preferably, when no heater is installed in heater receiving cavity, the temperature sensor also measures the chocolate temperature, as the heat transferred from the smoke would also heat and soften the chocolate, and meanwhile an alarm is installed in smokable aerosol product main body to notice the smoker to stop suction to avoid further heating of chocolate by smoke.

It will be appreciated that smoker may remove the chocolate from the chocolate receiving cavity at any time before and after smoking by detaching the mouth end.

Preferably, the inner wall and the middle wall forming one side of chocolate receiving cavity are provided with the smooth oily surface structured paper.

More preferably, the paper or the smooth oily surface structure is provided by the food grade paper.

Step (c) in particular comprises: achieving a detachable electrical connection between the signal line and the spectrum processor lead-out terminal via a pluggable interface, the heater also being electrically connected through a detachable electrical connection between lead-out wires and a controller lead-out terminal via a pluggable interface, connecting the mouthpiece to the smokable aerosol product main body after the electrical connection of the signal wires and/or heater is completed, the connection between the mouthpiece and the smokable aerosol product main body is achieved by snapping or threading connection with no more than 3 revolutions.

Benefits

A. Enable smelling of a real chocolate aroma while smoking aerosol and able to heat the chocolate by heating the chocolate heater, or by the heat transferred through the natural heat of the aerosol, thereby controlling the aroma emission intensity, increasing the desire to eat even more.

B. The removable mouth end design enables the chocolate to be removed from the mouthpiece main body at any time before and after smoking, experiencing a realistic smoking experience of chewing the realistic chocolate.

C. The paper mould employed to make the chocolate column with hollow solid enclosing structure acts as both forming and packaging, saving demoulding costs, with cleanliness and hygiene; the chocolate columns with hollow solid enclosing structure can also be retailed as bulk or in packages at the same time, not necessarily contained in the mouthpiece, making multiple ways of eating the product.

D. The chocolate column profile with hollow solid enclosing structure is intriguing to allow the children to imagine licking as cocking sleeve over previously cleaned fingers or string on clean bar, increasing eating pleasure.

BRIEF DESCRIPTION OF DRAWINGS

FIG. 1A-1D is a schematic of the process for making chocolate beans according to the first example of the present invention, wherein

FIG. 4A-4D is a schematic view of the installation of a hollow chocolate cylinder, a heater and a temperature sensor, wherein

The reference numerals wherein are as follows: 1 smokable aerosol product main body, 2 battery, 3 controller, 4 spectrum processor, 5 aerosol generating substrate generation zone, 6 mouthpiece, 6-1 mouthpiece main body, 6-2 mouth end, 7 inner wall, 8 middle wall, 9 outer wall, 10 aerosol channel, 11 chocolate receiving cavity, 12 heater receiving cavity, 13 closed structure, 14 through hole, 15 thermometry hole, 16 carrier, 17 coil, 18 infrared temperature sensor.

DETAILED DESCRIPTION OF THE EMBODIMENTS

Example 1

Figure 1A:
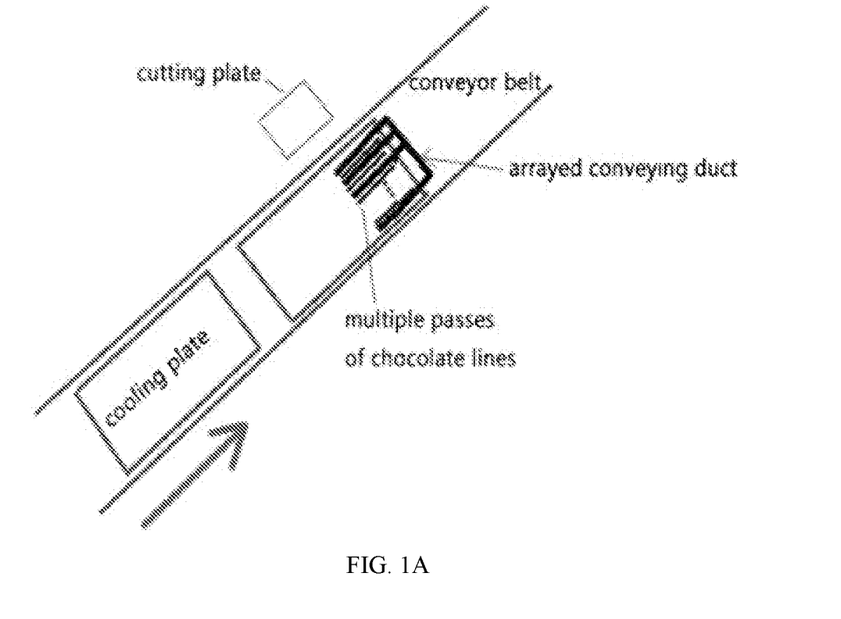
FIG. 1A is a schematic representation of the upstream multiple passes of chocolate line formation process.

This example first illustrates the method of making the chocolate beans, as shown in FIG. 1A, cooling plates made of food grade metal plates equidistantly spaced from one another on a conveyor belt are being transported, and the arrayed conveying ducts start to apply the chocolate to the surface of the cooling plate, when the front end of the cooling plate reaches a pre-set position, and the chocolate output from the array conveying ducts forms multiple lines of chocolate on the surface of the cooling plate, as the cooling plate moves.

Figure 1B:
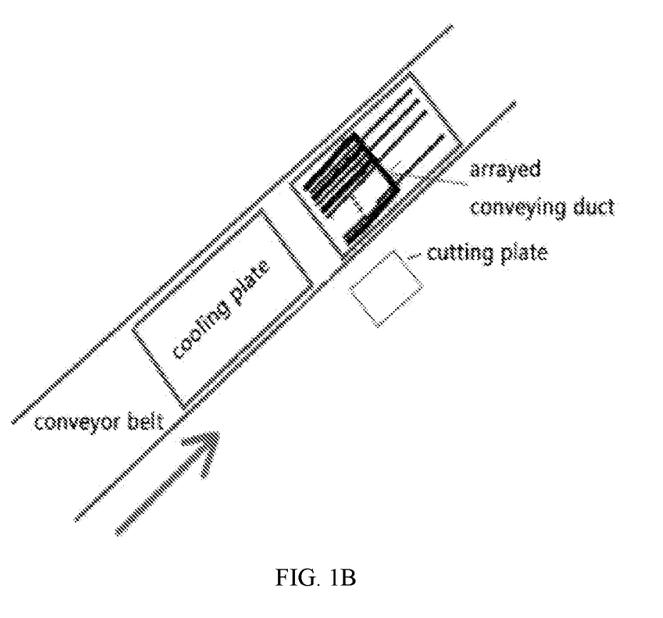
FIG. 1B is a schematic view of the result of chocolate process with multiple passes of chocolate lines completely formed and the flexible chocolate cut off by the cutting-off plate.

As in FIG. 1B, when multiple passes of chocolate lines are formed to a pre-set length, a cutting-off plate provided on one side of the arrayed conveying ducts passes through the output port to cut the flow of chocolate. When the flexible chocolate falls again, just touches one end of the next cooling plate, again continues to move to form a second plurality of lines of chocolate, and the flow of chocolate is cut to work in this continuous cycle. Multiple sets of multiple lines of chocolate are formed.

Figure 1C:
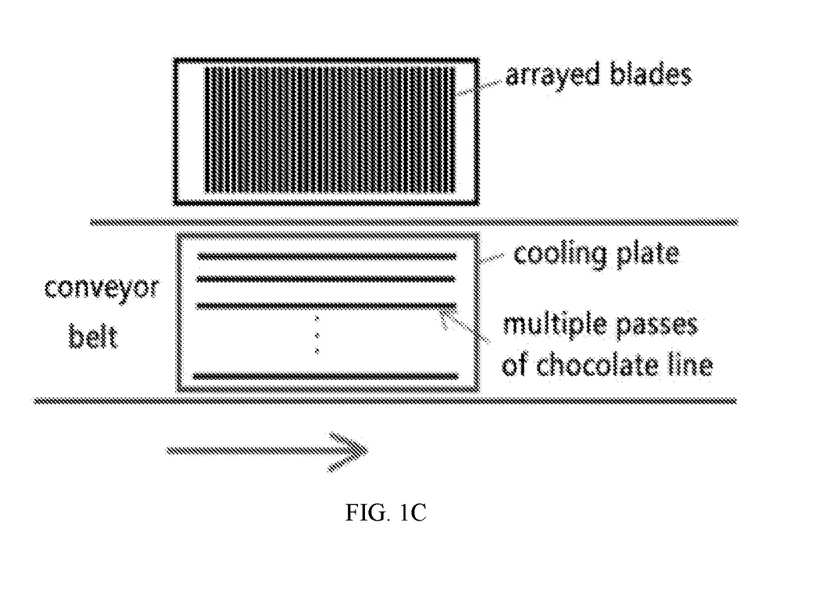
FIG. 1C is a schematic view of a midstream arrayed blades structure and a cooling plate carrying multiple passes of chocolate lines conveyed below the arrayed blades (the arrayed blade structure is drawn alongside the conveyor belt for clarity)
Figure 1D:
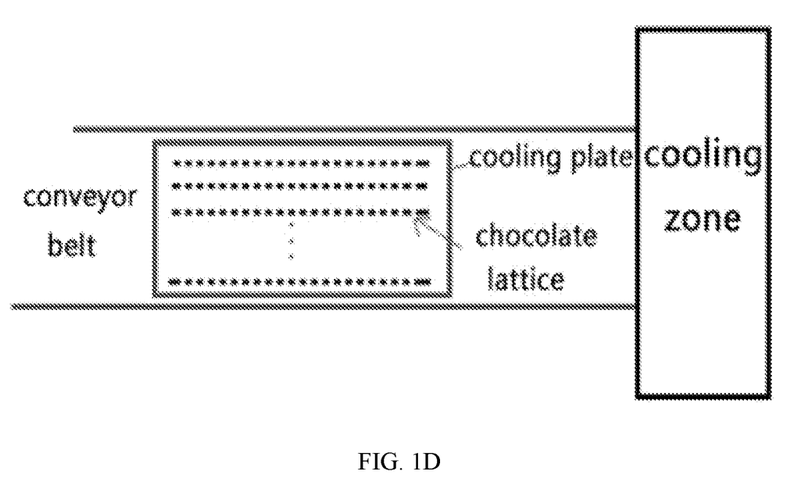
FIG. 1D is a schematic view of an arrayed blades on its way to a downstream cooling zone, after cutting multiple passes of chocolate lines and forming a chocolate lattice.

As shown in FIG. 1C, when the cooling plate carrying multiple passes of chocolate lines is transported by the conveyor belt to midstream, after the cooling plate is directly opposed to the arrayed blades with a spacing of 4 mm between two adjacent blades and each blade having a thickness of 2.5 mm, the arrayed blades are pressed down to cut multiple passes of chocolate lines to form a chocolate lattice (as shown in FIG. 1D).

As in FIG. 1D, the chocolate lattice is transported to the downstream cooling zone for cooling and hardening and output to form chocolate beans, which are finally collected and packaged.

Example 2

Figure 2:
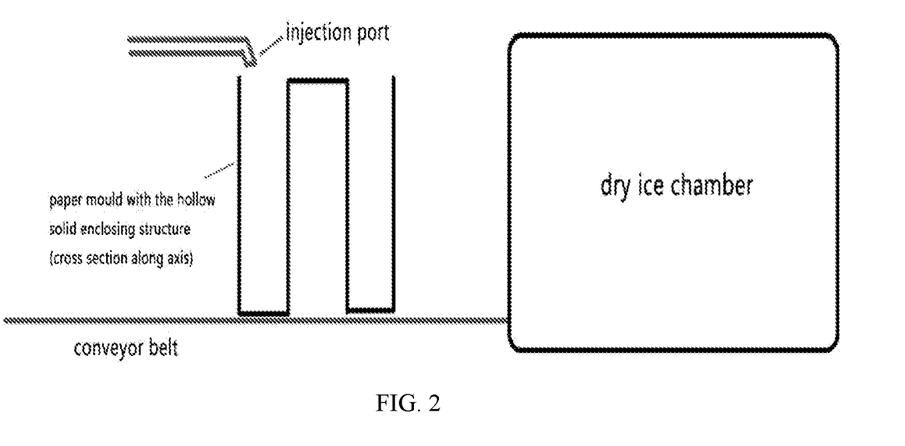
FIG. 2 is a flow chart of the process for making a chocolate column of the hollow solid enclosing structure of the second example of the present invention.

This example will illustrate the method of making a chocolate column of the hollow solid enclosing structure, as shown in FIG. 2, pre-fabricating a paper mould of a plurality of hollow solid enclosing structures, which is put on a conveyor belt to be conveyed to an injection port, such that the hollow faces the injection port position, injecting the pulped chocolate from the injection port into the hollow. The pulped chocolate supplied at the injection port is cut off when it is about to be full, waiting for the next mould to reach the injection port to continue to open supply. The moulds are then conveyed to a midstream dry ice chamber for cooling, and the cooled moulds exit from the dry ice chamber are continued for downstream collection and packaging. Packaging requires a tearable seal film layer to the top surface of the mold.

Example 3

Figure 3:
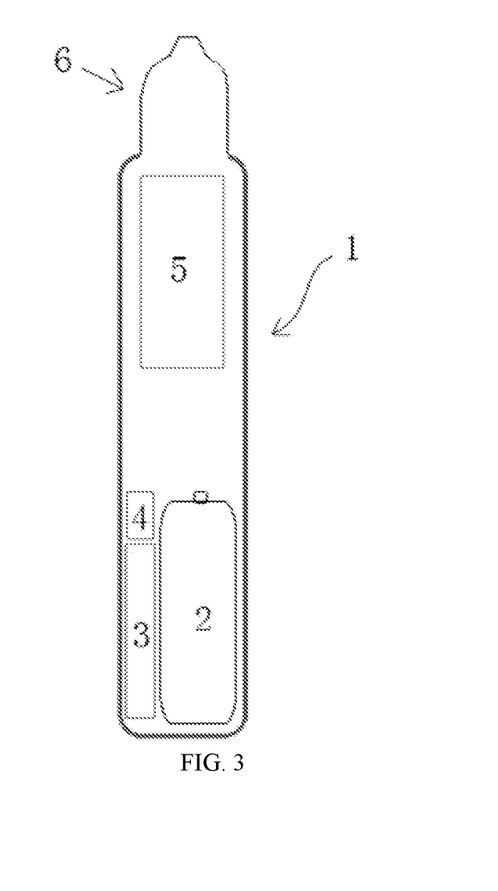
FIG. 3 is a schematic view of the structure of a smokable aerosol product of the third example of the present invention having a mouthpiece that can accommodate chocolate beans prepared as in the first example, or a column of chocolate with hollow solid enclosing structure prepared as in the second example.

This embodiment describes a solution for a mouthpiece reality smoking experience. As shown in FIG. 3, the smokable aerosol product in the present invention having a mouthpiece that can accommodate chocolate beans prepared as in Example 1 or a column of chocolate in a hollow solid enclosing structure prepared as in Example 2, comprises a smokable aerosol product main body 1 in which is provided a battery 2, a controller 3, a spectroscopy processor 4 in electrical connection with the controller 3, and an aerosol-generating substrate generation zone 5, and a mouthpiece 6 in connection with the smokable aerosol product main body 1. The aerosol-generating substrate generation zone 5 is provided with a cartridge, an atomizer, an aerosol transport channel (not shown) in communication with aerosol channel in the mouthpiece.

Based on the mouthpiece 6 in the smokable aerosol product described above, the present embodiment describes a chocolate making method comprising the steps of:
(a) preparing a mouthpiece that can contain the chocolate;
(b) receiving the prepared chocolate into the mouthpiece and installing a temperature sensor and/or a heater into the mouthpiece;
(c) connecting the mouthpiece of step (b) with a smokable aerosol product main body to complete the making procedure.

Figure 4A:
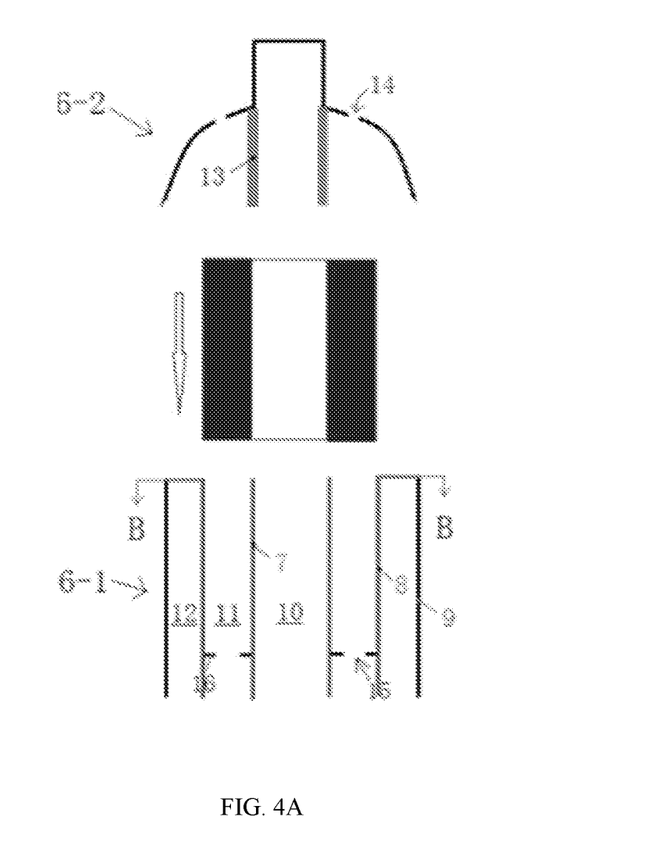
FIG. 4A is a schematic of the process of detaching the mouth end from the mouthpiece main body to place the hollow chocolate cylinder.

As shown in FIG. 4A, the mouthpiece in step (a) comprises a mouthpiece main body 6-1, a mouth end 6-2 removably coupled to the mouthpiece main body 6-1, wherein the mouthpiece main body 6-1 has an inner wall 7, a middle wall 8 and an outer wall 9 with a surrounding structure disposed in sequence from inside to outside, the surrounding inner wall 7 structurally forming an aerosol channel 10, the middle wall 8 and the inner wall 9 forming a chocolate receiving cavity 11 therebetween surrounding the aerosol channel 10, and the outer wall 9 and the middle wall 8 forming a heater receiving cavity 12 therebetween surrounding the chocolate receiving cavity 11.

The chocolate is a chocolate cylinder of hollow solid enclosing structure in the embodiment 2 that matches the geometry of the chocolate receiving cavity. The chocolate receiving cavity 11 comprises a carrier portion 16, formed in chocolate receiving cavity 11, with 2 thermometric holes 15 secured to the inner wall 7 and the middle wall 8. The top of the heater receiving cavity 12 has a sealing ring. The prepared hollow chocolate cylinder is placed into the chocolate receiving cavity 11 as in direction of the arrows in FIG. 4A, such that the carrier 16 supports the hollow chocolate cylinder.

Figure 4B:
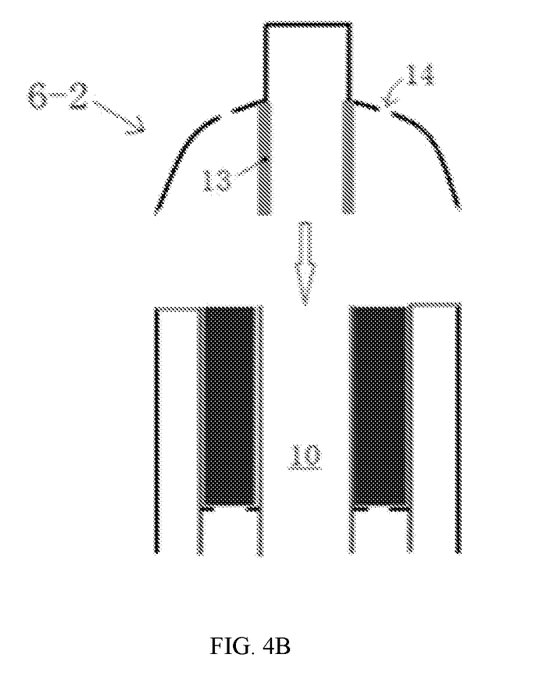
FIG. 4B is a schematic view of the process of connecting the mouth end to the mouthpiece main body after the hollow chocolate cylinder has been placed in FIG. 4A.
Figure 4C:
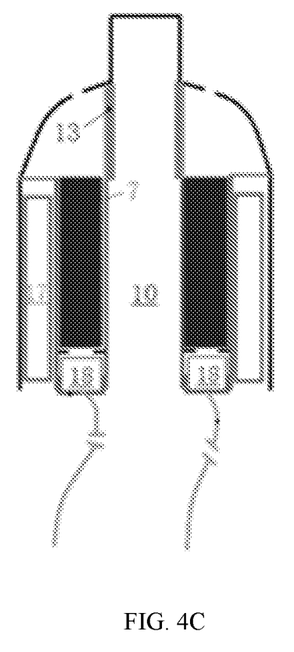
FIG. 4C is a schematic view of the results after mounting of the fixed coil and mounting of the lid infrared temperature sensor lead-out signal wire.
Figure 4D:
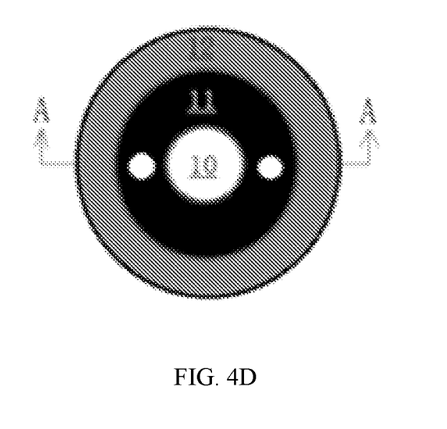
FIG. 4D is a schematic top view of the mouthpiece body with orientation indicated by the sealing ring surface B in FIG. 4A, wherein the mouthpiece main body in FIG. 4A-4C is a schematic view of a cross-sectional structure oriented as shown in radial cross-section A of the top view structure in FIG. 4D.

The mouth end 6-2 having a closed structure 13. When the mouth end 6-2 is connected to the mouthpiece main body 6-1 as indicated by the arrow in FIG. 4B, the closing 
structure 13 abuts against the inner wall 7, forming an air flow barrier between the chocolate containment chamber 11 and the aerosol channel 10 (FIG. 4C), with the mouth end 6-2 having 2 through holes 14 in communication with the chocolate containment chamber 11 for discharging chocolate aroma. As shown in FIG. 4C, the closing structure 13 simultaneously acts as a passage for aerosol transmission.

After connecting (snapping or screw connection) the mouth end 6-2 with the mouthpiece main body 6-1 as in FIG. 4B, as also shown in FIG. 4C, mounting the coil 17 into the heater receiving chamber 12. Two infrared temperature sensors 18 are installed into the chocolate containment chamber 11 on the other side opposite to the side of the carrier 16 supporting the chocolate, screwing on the cap closure at the bottom of the chocolate containment chamber 11 by means of a sealing thread, and directing signal lines from fine apertures (not shown in FIG. 4C) at the bottom of the sealing cap, and sealing the fine apertures with sealant (such as at least one of glass glue, silicone grease, epoxy, etc.).

A detachable electrical connection between the signal line and the spectrum processor 4 lead-out terminal (not shown in FIG. 3) via a pluggable interface (neither shown in FIG. 3 nor FIG. 4C) is achieved, and the coil 17 is electrically connected through a pluggable interface (both not shown in FIG. 3 and FIG. 4C), also through a detachable electrical connection, with the lead-out wires (not shown in FIG. 4C) and the controller 3 lead-out terminals (not shown in FIG. 3), and finally the mouthpiece 6 is snap-connected to the smokable aerosol product main body 1 after electrical connection of the signal wires and coil is completed.

The infrared temperature sensor 18 calculates the current chocolate temperature by the spectrum processor 4 provided in the main body 1 of the smokable aerosol product by receiving infrared rays emitted by the chocolate into the thermometer hole 15 in real time. When the temperature exceeds a pre-set temperature of 50° C., the controller 3 controls the coil 17 to be turned off, i.e., controls the power supply 2 to stop outputting power to the coil 17.

Even when the coil 17 is not installed in the heater receiving chamber 12 in FIG. 4C, since the heat transferred from the smoke will heat and soften the chocolate, the infrared temperature sensor 18 can also measure the chocolate temperature, and at this point an alarm (both not shown in FIG. 3 and FIG. 4C) will be installed in the smokable aerosol product main body 1 to notice the smoker to stop suction to avoid further heating of the chocolate by the smoke.

What is claimed is:

1. A method of making chocolate, comprising the steps of:

(a) preparing a mouthpiece that can contain the chocolate;

wherein the mouthpiece comprises a mouthpiece main body and a mouth end removably coupled to the mouthpiece main body, wherein the mouthpiece main body has an inner wall, a middle wall and an outer wall arranged in sequence from the inner to the outer wall with enclosing structures, the inner wall structure forming an aerosol channel, the middle wall and inner wall forming a chocolate receiving cavity therebetween surrounding the aerosol channel, and the outer wall and the middle wall forming a heater receiving cavity therebetween surrounding the chocolate receiving cavity;

(b) producing a prepared chocolate, wherein the prepared chocolate comprises granulated chocolate beans and a chocolate column, wherein:

the granulated chocolate beans are produced by a process comprising:

forming a plurality of lines of chocolate on a cooling plate from an arrayed conveying duct;

using a cutting-off plate to block the chocolate within the arrayed conveying duct from continuing to fall after the plurality of chocolate lines are formed;

dividing the plurality of chocolate lines into chocolate dots using arrayed blades; and cooling the chocolate dots to form the granulated chocolate beans; and the chocolate column is made by a process comprising:

making a paper mould with a hollow solid enclosing structure;

injecting pulped chocolate into the hollow solid enclosing structure to form a filled mould;

conveying the filled mould through a midstream dry ice chamber to cool the pulped chocolate; and collecting the mould containing the cooled chocolate column, wherein the column of chocolate can be removed from the mould in use:

(c) receiving the prepared chocolate from step (b) into the chocolate receiving cavity of the mouthpiece and installing a temperature sensor and/or a heater into the mouthpiece; and (d) connecting the mouthpiece of step (c) with a smokable aerosol product main body to complete the making procedure.

2. The method of claim 1, characterized in that, the mouth end has a closed structure which abuts against the inner wall to form an air flow barrier between the chocolate receiving cavity and the aerosol channel, with at least one through hole in communication with the chocolate receiving cavity, when the mouth end is coupled to the mouthpiece main body.

3. The method of claim 1, characterized in that, the chocolate receiving cavity comprises a carrier portion extending between and secured to the inner wall and the middle wall;

the carrier portion defining at least one thermometric aperture configured to permit temperature measurement of chocolate within the chocolate receiving activity; and an end of the heater receiving cavity proximate the mouth end has a sealing ring.

4. The method of claim 1, characterized in that, the granulated chocolate bean has a diameter of 1-5 mm and the geometry of the chocolate column matches the geometry of the chocolate receiving cavity, the geometry of the chocolate column being selected from a group consisting of a hollow cylinder, a hollow prism, and a hollow elliptical column, wherein the chocolate column has walls of pre-set thickness, the pre-set thickness being 2-5 mm.

5. The method of claim 1, characterized in that the cooling plates is made of metal;

the array blades have a spacing of less than 6 mm between two adjacent blades, each of which has a thickness of 1-3 mm, so that adjacent dots of the chocolate dots can be divided with spatial distances between them; and the surface of the paper mould is in contact with the pulped chocolate.

6. The method according to claim 1, characterized in that, step (c) comprises:

the chocolate receiving cavity comprises a carrier portion, extending between and secured to the inner wall and the middle wall, the carrier portion defining at least one thermometric aperture;

an end of the heater receiving cavity proximate the mouth end has a sealing ring;

placing the prepared chocolate into the chocolate receiving cavity such that the carrier portion supports the chocolate, then connecting the mouth end with the mouthpiece main body;

mounting the heater into the heater receiving cavity, and/or mounting at least one temperature sensor into the chocolate receiving cavity on the other side opposite to the side of the carrier portion supporting the chocolate, capping at the bottom of the chocolate receiving chamber by a sealing cap and directing signal wires through apertures at the bottom of the sealing cap, and sealing the apertures with sealant.

7. The method of claim 6, characterized in that, the heater is a coil or a microwave radiation device, the temperature sensor is an infrared temperature sensor, the current temperature of the chocolate is calculated by a spectroscopy processor provided in the main body of the smokable aerosol product by receiving the infrared rays emitted by the chocolate in real time to the temperature sensor, a controller provided in the main body of the smokable aerosol product controls the heater to be turned off when the temperature exceeds a predetermined temperature.

8. The method of claim 7, wherein the predetermined temperature is 37-60° C., the sealing cap is screwed and the sealant comprises at least one of glass glue, silicone grease and epoxy.

9. The method of claim 7, characterized in that, when no heater is installed in the heater receiving cavity, an alarm is installed in the smokable aerosol product main body to notify a smoker to stop suction to avoid smoke further heating the prepared chocolate.

10. The method of claim 7, characterized in that the inner wall and the middle wall forming one side of the chocolate receiving cavity are provided with paper having a surface configured to facilitate release of the prepared chocolate.

11. The method of claim 9, characterized in that the inner wall and the middle wall forming one side of the chocolate receiving cavity are provided with paper having a surface configured to facilitate release of the prepared chocolate.

12. The method of claim 7, characterized in that, step (d) comprises:

installing the temperature sensor and the heater and forming a detachable electrical connection between a signal line from the temperature sensor and a lead-out terminal of a spectrum processor via a pluggable interface, the heater being also electrically connected through a detachable electrical connection between lead-out wires and a controller lead-out terminal via a pluggable interface, connecting the mouthpiece to the smokable aerosol product main body after the electrical connection of the signal wires and heater is completed, the connection between the mouthpiece and the smokable aerosol product main body is achieved by snapping or threading with no more than 3 revolutions.

* * * * *